United States Patent [19]

Pompei

[11] Patent Number: 5,528,041
[45] Date of Patent: *Jun. 18, 1996

[54] RADIATION DETECTOR WITH REMOTE TEMPERATURE REFERENCE

[75] Inventor: Francesco Pompei, Boston, Mass.

[73] Assignee: Exergen Corporation, Watertown, Mass.

[*] Notice: The term of this patent shall not extend beyond the expiration date of Pat. No. 5,229,612.

[21] Appl. No.: 254,126

[22] Filed: Jun. 6, 1994

Related U.S. Application Data

[63] Continuation-in-part of Ser. No. 41,933, Apr. 2, 1993, Pat. No. 5,319,202, which is a continuation of Ser. No. 716,038, Jun. 14, 1991, Pat. No. 5,229,612, which is a continuation-in-part of Ser. No. 561,169, Aug. 1, 1990, abandoned.

[51] Int. Cl.$^6$ ........................................ G01J 5/26
[52] U.S. Cl. ........................................ 250/349; 250/338.1
[58] Field of Search .......................... 250/349, 338.1, 250/342, 340; 374/124, 126, 121, 116

[56] References Cited

U.S. PATENT DOCUMENTS

| | | | |
|---|---|---|---|
| 4,623,266 | 11/1986 | Kielb | 374/181 |
| 4,682,898 | 7/1987 | Janssen | 136/224 |
| 4,722,612 | 2/1988 | Junkert et al. | 374/124 |
| 4,790,324 | 12/1988 | O'Hara et al. | 128/664 |
| 4,895,164 | 1/1990 | Wood | 374/124 |
| 4,932,789 | 6/1990 | Egawa et al. | 128/664 |
| 5,229,612 | 6/1993 | Pompei et al. | 250/349 |
| 5,319,202 | 6/1994 | Pompei | 250/349 |

FOREIGN PATENT DOCUMENTS

| | | | |
|---|---|---|---|
| 387402 | 1/1924 | Germany. | |
| 0139481 | 8/1983 | Japan | 136/224 |
| A1097695 | 1/1968 | United Kingdom. | |

OTHER PUBLICATIONS

Patent Cooperation Treaty (The International Searching Authority), International Search Report.
First Written Opinion from International Preliminary Examining Authority, Munchen, Germany.

(List continued on next page.)

Primary Examiner—Davis L. Willis
Assistant Examiner—Richard Hanig
Attorney, Agent, or Firm—Hamilton, Brook, Smith & Reynolds

[57] ABSTRACT

A radiation detector employs a thermopile having a potentiometer for calibrating the thermopile output to best suit a particular output meter and sensing application. A thermocouple may be connected in series with the thermopile. The output of the thermopile is calibrated to best match a linear function which intersects the thermopile output function at a temperature in the center of a temperature range of interest. A total output signal of the detector is the sum of the thermopile signal and the thermocouple signal, and is indicative of the temperature of a target emitting radiation sensed by the thermopile. The series connection of the thermopile and the thermocouple allow the thermopile hot junction temperature to be referenced to the cold junction temperature of the thermocouple. Thus, the reference temperature may be remote from the thermopile sensor. A filtering lens may be used to prevent short wavelength radiation from reaching the thermopile sensor, improving the linearity of the thermopile response. To improve the response to low emissivity targets, long wavelength radiation may be filtered out at a loss of linearity. Two detectors may be connected differentially to provide a differential output indicative of the temperature difference between two targets. Additionally, a temperature dependent variable resistor may be coupled to the thermopile, providing a variable resistance that combines with the thermopile output response to produce a linearized thermopile output response. Then, the total output signal of the detector for a particular target temperature is independent of fluctuations in local temperature.

19 Claims, 7 Drawing Sheets

OTHER PUBLICATIONS

Patent Abstracts of Japan, vol. 10, No. 241, (p. 488) (2297) 20 Aug. 1986, & JP, A, 61071326 (Fujitsu), 12 Apr. 1986, see abstract.

Willard, Hobart H., et al, "Instrumental Methods of Analysis," D. Van Nostrand Company, 1981, pp. 78–79.

5,528,041

RADIATION DETECTOR WITH REMOTE TEMPERATURE REFERENCE

RELATED APPLICATIONS

This is a continuation-in-part of application Ser. No. 08/041,933, filed Apr. 2, 1993, now U.S. Pat. No. 5,319,202, which is a continuation of application Ser. No. 07/716,038, filed Jun. 14, 1991, now U.S. Pat. No. 5,229,612, which is a continuation-in-part of application Ser. No. 07/561,169, filed Aug. 1, 1990, now abandoned. All of the above-noted applications are incorporated herein by reference.

BACKGROUND

Quality control of a product or process has become a large part of the economics of industry. A major concern of quality control is accuracy in measuring and the ability to detect the slightest fault in a variety of products and processes. Various devices are used to measure differences in weight, temperature and other dimensions. Such devices are usually non-portable, time consuming, inaccurate, invariable for use in detecting more than one object, and often incapable of giving a quantitative analysis.

Radiation detectors can be used to detect abnormalities by measuring temperature change and heat loss or gain. Radiation detectors have been used as a non-contact alternative to many temperature sensors. Infrared scanning devices have also been used to detect temperature differences between a subject and a reference as well as to measure heat loss from machinery, plumbing, electrical lines and the like. Typically such radiation detectors and infrared scanning devices employ radiation sensors which respond to changes in radiation in the order of 1/10 second. Such sensors are not only fast, but accurate and economic as operations of interest do not need to be shut down during detection.

Radiation detectors are based on the principle that the thermal radiation emitted from a subject is proportional to the temperature of the subject raised to the fourth power. The radiation emitted is also a function of the emissivity of the subject and of background radiation, but can be calibrated out for applications in which the target has consistent properties.

One type of radiation sensor is a thermopile. Thermopiles in general have been used to provide an indication of target temperature. A thermopile operates on the principle that sensed radiation causes a voltage to be produced at the thermopile output which is indicative of the difference between the hot and cold junctions of the thermopile.

One typical problem with radiation sensors such as thermopiles is their tendency to become overheated by energy trapped within the device. Such overheating and retaining of energy by the radiation sensor causes inaccuracies in the temperature readings. Many sensing applications require close range detection. A user in such a situation often runs the risk of heating or cooling the device with changing environmental conditions, which may change the cold junction temperature of the device or perhaps even distort the sensor output by causing uncontrolled thermal gradients. In addition to heat management problems, radiation sensor devices face dirty as well as harsh environments. Elaborate cooling, purging and cleaning systems have been used, but are expensive, clumsy and require maintaining close calibration.

SUMMARY OF THE INVENTION

Provided with the present invention is a radiation detector having a thermopile sensing radiation emitted from a target, and providing an output signal indicative of the temperature of the target. To allow calibration of the thermopile output signal, a calibrator such as a potentiometer or other variable resistance is provided at the thermopile output in a passive circuit, one comprising simple impedances without the active gain obtainable in an amplifier. By enabling a user to adjust the potentiometer, the thermopile output signal may be user scaled to calibrate the output signal to intersect a thermocouple output response at a desired target temperature.

Although the thermopile and potentiometer together form a detector which can be adjusted to suit a particular application, a preferred embodiment also has a thermocouple which provides an output signal that combines with the output signal of the thermopile to produce a total output signal. To provide compensation for output changes due to changes in local temperature, the change in the thermopile output signal with a change in the local temperature is inversely related to the change in the thermocouple output signal with a change in the local temperature.

By connecting the thermocouple electrically in series with the thermopile, the output voltages of the thermopile and the thermocouple combine to provide a total output voltage. The hot junction of the thermocouple is held at the cold junction temperature of the thermopile. Thus, with the thermopile thermal response to the common junction local temperature being close to the inverse of the thermocouple thermal response to the local temperature, changes in the total output signal are substantially independent of fluctuation of the temperature at which the thermocouple hot junction and the thermopile cold junction are held.

In one embodiment, a lens is provided for filtering out shorter wavelengths from the radiation sensed by the thermopile. This helps improve the linearity of the thermopile thermal response in a target temperature range of interest. With the total output response of the sensor approximating a linear function in a temperature range of interest, a linear output means such as a meter responsive to linear inputs may be controlled directly from the total output signal.

In another embodiment, the filter passes shorter wavelengths, substantially filtering out longer wavelengths such as those greater than 6 microns. Although such a sensor loses linearity, it is significantly less sensitive to changes in emissivity with change in temperature over a narrow target temperature range. Accordingly, such a device is particularly suited to low emissivity targets.

The cold junction temperature to which the hot junction temperature of the thermopile is referenced is at the local hot junction temperature of the thermocouple which is referenced to the thermocouple cold junction. The thermocouple cold junction reference temperature may be located remote from its hot junction and the thermopile sensor. This prevents changes in output of the sensor due to incidental heating of the local reference temperature due to its proximity to the target.

One embodiment of the present invention provides for a differential radiation detector. In that embodiment, a first thermopile senses radiation from a first target and provides an output signal indicative of the temperature of the first target. A first thermocouple provides an output signal which combines with the output signal of the first thermopile to produce a first total output signal. A change in the output signal of the first thermopile with changes in a first local temperature is inversely related to a change in the output signal of the first thermocouple with changes in the first local temperature.

In addition to the first thermopile/thermocouple combination, a second thermopile senses radiation from a second target and provides an output signal indicative of the temperature of the second target. A second thermocouple provides an output signal which combines with the output signal of the second thermopile to produce a second total output signal. A change in the output signal of the second thermopile with changes in a second local temperature is inversely related to the change in the output signal of the second thermocouple to changes in the second local temperature. The cold junction of the first thermocouple and second thermocouple are held to a common temperature and the thermocouple/thermopile pairs are coupled to provide a differential output. Calibrators and lenses may also be provided in the same manner as with the single thermopile sensor embodiment. It is preferable that the thermopiles are matched and the thermocouples are matched to provide an accurate differential response.

In accordance with another embodiment of this invention, a radiation detector has a temperature dependent variable resistor coupled to the thermopile and providing a variable resistance that combines with the thermopile output voltage to produce a linearized thermopile output voltage. As such, the thermopile output, linearized by the thermistor, combines with the linear thermocouple output to provide a detector output that is more stable with changes in the thermopile cold junction temperature.

In the aforementioned embodiments, the thermopile and the thermocouple together form a detector suitable for applications for an expected mean target temperature and within a common junction local temperature range. However, since the linear thermal response of the thermocouple is employed to compensate for the non-linear thermal response of the thermopile, the local temperature range of the common junction must be known and relatively narrow. Accordingly, the primary advantage of this embodiment is that detector output less dependent on the thermopile cold junction temperature over a broad range.

Accordingly, a thermocouple is connected electrically in series with the thermopile/thermistor circuit such that changes in the thermocouple output voltage due to changes in thermopile cold junction temperature are inversely related to changes in the linearized thermopile output voltage due to said changes in thermopile cold junction temperature. Thus, this embodiment utilizes the thermocouple, which provides a linear thermocouple output, to compensate for the linearized thermopile output with changes in the cold junction temperature of the thermopile, thereby maintaining a stable detector output voltage for a given target temperature. Since the thermocouple is connected in series with the thermopile/thermistor circuit, the remote thermocouple cold junction becomes-the thermopile reference. As such, there is no need to measure the thermopile cold junction temperature or to force the cold junction temperature into a particular range.

The temperature dependent variable resistor preferably comprises at least one negative temperature coefficient (NTC) thermistor electrically connected in series with the thermopile and thermally coupled to the cold junction of the thermopile. To achieve linearization of the thermopile output voltage over a thermopile cold junction temperature range, an NTC thermistor is selected wherein the change in the resistance of the thermistor due to a change in thermopile cold junction temperature modifies the thermopile output response in a manner that is inversely related to the change in the thermopile output voltage with said change in thermopile cold junction temperature. In an alternative configuration, at least one positive temperature coefficient thermistor may be electrically connected in parallel with the thermopile and thermally coupled to the thermopile cold junction. In either case, the resulting thermopile output voltage is a more linear function with changes in the thermopile cold junction temperature.

This embodiment of the present invention is particularly useful in applications in which the target temperature is known and relatively stable. Depending on the target temperature range of interest, different types of thermistors or even multiple thermistors may be used in combination with standard resistors to provide for linearization of the thermopile output voltage over a wide range of thermopile cold junction temperature variations.

As in previous embodiments, a calibrator such as a potentiometer may be employed to fine-tune the linearized thermopile output response to intersect a thermocouple output response at a desired target temperature to produce a stable detector output for a thermopile cold junction temperature range of interest. Also, since thermopiles have parameters that vary significantly from device to device, the potentiometer may be adjusted to compensate for these variations such that a number of devices may be tuned to provide the same detector output for the desired target temperature.

In accordance with another aspect of the present invention, the thermocouple may comprise a nonintersecting pair of leads formed of different thermocouple materials and coupled to a thermopile circuit such that the thermopile circuit actually serves as the hot junction of the thermocouple. For the thermocouple to be electrically connected in series with the thermopile, a first thermocouple lead is electrically connected to one of a pair of thermopile leads which are connected to a thermopile circuit and therefore held at the cold junction temperature of the thermopile. Although the second thermocouple lead is not electrically connected directly to a thermopile lead, it is electrically connected to the thermopile circuit. Further, the second thermocouple lead is mounted in close proximity to the thermopile and thermally coupled to the cold junction of the thermopile with epoxy. With both thermocouple leads held at the same temperature, the temperature of the thermopile cold junction, the leads do not have to intersect to provide a thermocouple hot junction.

A meter may be coupled to the detector output. The meter may be of a type typically used to measure a thermocouple output. Since both the meter and the thermopile circuit are high impedance devices, the thermopile acts as an antenna receiving stray high frequency noise which distorts the meter measurement. In accordance with the present invention, a filter is coupled to the thermopile to attenuate high frequency noise, specifically noise at and above 60 Hz. Preferably, the filter comprises a capacitor having a value of 1–5 μf and which is connected in parallel with the detector output. At high frequencies, the capacitor causes the thermopile circuit output impedance to be low thereby eliminating the presence of high frequency noise at the meter.

In another embodiment of the present invention, a radiation detector comprises a thermopile and a thermistor and provides a linearized thermopile output voltage. Since the linearized thermopile output is a linear function with changes in the thermopile cold junction temperature, a linear output means with linear cold junction compensation may be coupled to the detector to provide temperature indications.

In yet another embodiment of the present invention, a temperature monitoring system monitors the temperature of a product positioned in a process chamber. The monitoring system comprises a thermopile which senses radiation emitted by the product and provides a thermopile output signal indicative of the product temperature. Preferably, a thermocouple and a temperature dependent variable resistor are electrically and thermally coupled to the thermopile to provide an output signal indicative of the product temperature. As long as the product temperature remains within acceptable limits, the output signal is a linear function over a product temperature range of interest and is independent of fluctuations in local temperature.

The monitoring system also comprises a thermal heat sink having a first end extending into the process chamber and having a second end disposed in an ambient temperature environment. The heat sink may comprise a copper pipe or a heat pipe. The radiation detector is thermally coupled to the heat sink adjacent to the first end to view the product. Since the components within the radiation detector have a maximum local operating temperature which may be less than the temperature of the process chamber, the temperature of the heat sink adjacent to the detector does not exceed the maximum operating temperature of the components within the detector.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 1A:
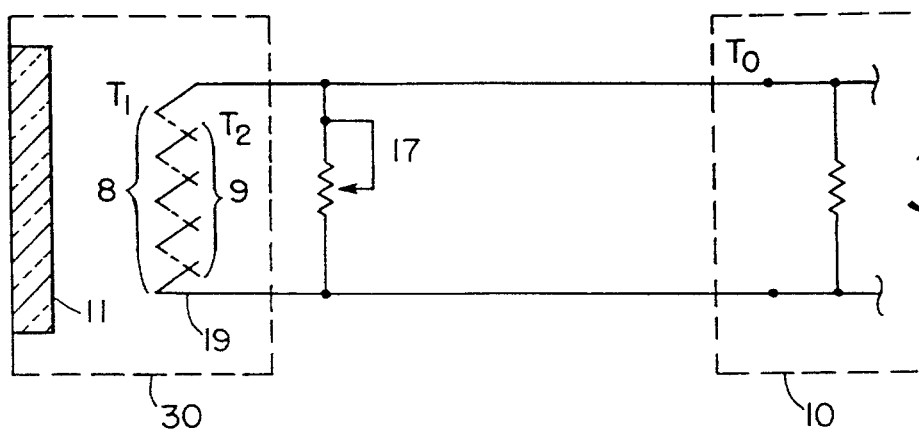
FIG. 1A is a diagram of the electrical circuit of a thermopile radiation detector embodying the present invention.

Shown in FIG. 1A is a radiation detector which uses a thermopile 19 to sense radiation emitted from a target. A potentiometer 17 is connected across the output leads of thermopile 19 to provide a means by which to calibrate the thermopile output. As further described below, this calibration enables a final output voltage, and hence, a target temperature displayed by a readout device 10, to be closely related to sensed radiation in a temperature range of interest. In a preferred embodiment, potentiometer 17 is a 100KΩ trimpot.

A thermopile is defined to produce across its two ends a voltage proportional to the temperature difference of a series of hot and cold junctions between the two ends of the thermopile. Thus, the output voltage ($E_p$) of thermopile 19 can be represented by the relationship $$E_p = \alpha_p N(T_1 - T_2) K \tag{1}$$

where $T_1$ is the temperature of the hot junctions 8 of thermopile 19, $T_2$ is the temperature of the cold junctions 9 of thermopile 19, $\alpha_p$ is a Seebeck coefficient for the thermopile materials, N is the number of hot and cold junctions 8 and 9, and K is a scaling coefficient due to the potentiometer 17.

In general, the relationship between target temperature $T_T$, and thermopile output voltage $E_p$ may be shown by the following equation:

$$E_p = \alpha_p N(T_1 - T_2) K = \alpha_p' e_T \sigma (T_T^4 - T_1^4) K \tag{3}$$

Where $\alpha_p'$ is a Seebeck coefficient for the thermopile in units of volts/BTU-hr-ft², $e_T$ is the emissivity of the target surface, and σ is the Stefan-Boltzmann constant. The coefficient $\alpha_p'$ can be further defined by the following relation:

$$\alpha_p' = (1 = c(T_2 - T_R)) \alpha_{pr}' \tag{4}$$

where c is a Seebeck temperature coefficient for the thermopile, $\alpha_{pr}'$ is the value of $\alpha_p'$ selected for a specific thermopile, cold junction reference temperature, and $T_R$ is the reference temperature for which $\alpha_{pr}'$ is selected. For practical applications $T_R$ is chosen as the expected value of $T_2$.

Substituting equation (4) into equation (3), the thermopile output voltage may be represented as $$E_p = (1 + c(T_2 - T_R)) \alpha_{pr}' e_T \sigma (T_T^4 - T_1^4) K \tag{5}$$

Figure 2:
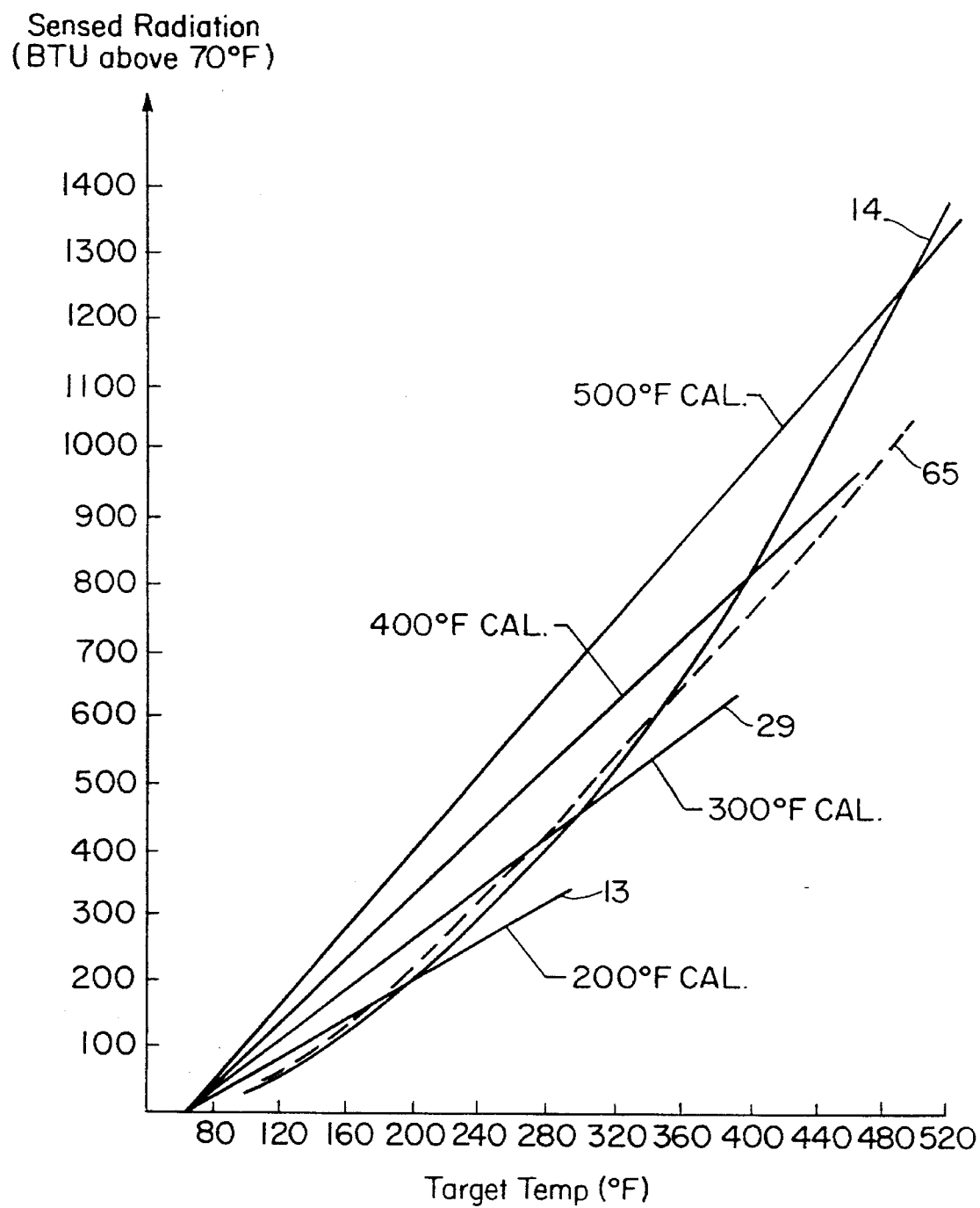
FIG. 2 is a graph of thermal response to sensed radiation of the thermopile of FIG. 1.

As shown by equation (5), the thermopile output voltage $E_p$ will change nonlinearly with changes in $T_T$ and $T_1$ due to the presence of the fourth power term ($T_T^4 - T_1^4$). This fourth power term is demonstrated by the curve 14 of FIG. 2 which shows how the radiation sensed by the thermopile 19 (in BTUs) increases with increasing target temperature. FIG. 2 assumes a thermopile cold junction temperature of $T_2 = 70°$ F., and the BTU scale of the curve therefore represents BTUs above 70° F.

Since the output device 10 is typically a standard meter which responds to a linear output function, such as is produced by a thermocouple, it is desirable to have the thermopile output voltage $E_p$ appear as much like a linear function of target temperature as possible. Shown in FIG. 2 with curve 14 are linear calibration lines showing a linear change in sensed radiation with changing target temperature, as would be desired when using a linear output device. Each calibration line is shown intersecting curve 14 at a different point. Within a given range of target temperatures around a particular intersection point, the curve 14, representative of the thermopile output, is a good approximation of the desired linear response. Within the given temperature range, the approximation is sufficient to allow the construction of an accurate temperature detector having a thermopile sensor and a linear output meter.

For design purposes, it is difficult to anticipate the temperature of the thermopile hot junction $T_1$. However, for most practical applications, $$(T_T-T_1) \gg (T_1-T_2)$$

Therefore, for the purposes of establishing the value of thermopile output voltage $E_p$, the approximation $T_1 \approx T_2$ can be used. Making the substitution of $T_2$ for $T_1$ in equation (5), the thermopile output voltage becomes:

$$E_p(1+c(T_2-T_R))\alpha_{pr}'e_t\sigma(T_T^4-T_2^4)K \qquad (6)$$

From equation (6), knowing the expected mean target temperature, and the expected cold junction temperature allows equation (6) to be manipulated to build a detector having an output response which intersects with a linear approximation function at the desired target temperature. For many applications, such a detector is sufficiently accurate within a range of target temperatures around the expected mean target temperature, and thereby functions as a practical detection device. However, for a given application, a means for calibrating the output voltage $E_p$ to the desired approximation is required.

The calibration of the thermopile response can be partially accomplished by selecting a thermopile having a value of $\sigma_{pr}'$ such that the thermopile output best achieves the desired intersection point between the thermopile curve and the chosen linear approximation. However, due to the limited types of thermopile materials available, the value of $\alpha_{pr}'$ often can not be selected as desired, in which case an intersection point at a desired target temperature can not be met. The present invention therefore provides potentiometer 17 which scales the of the thermopile, allowing the output voltage $E_p$ detector to be "fine-tuned" to the expected mean target temperature. This ensures that the approximation is as accurate as possible. Having the manually adjustable potentiometer 17 also allows a user of the detector to correct for any inaccuracies of the detector due to manufacturing tolerances or other influences. The presence of potentiometer scaling factor K in equation (6) shows that the thermopile output voltage $E_p$ can be controlled by controlling the setting of the potentiometer.

Figure 1B:
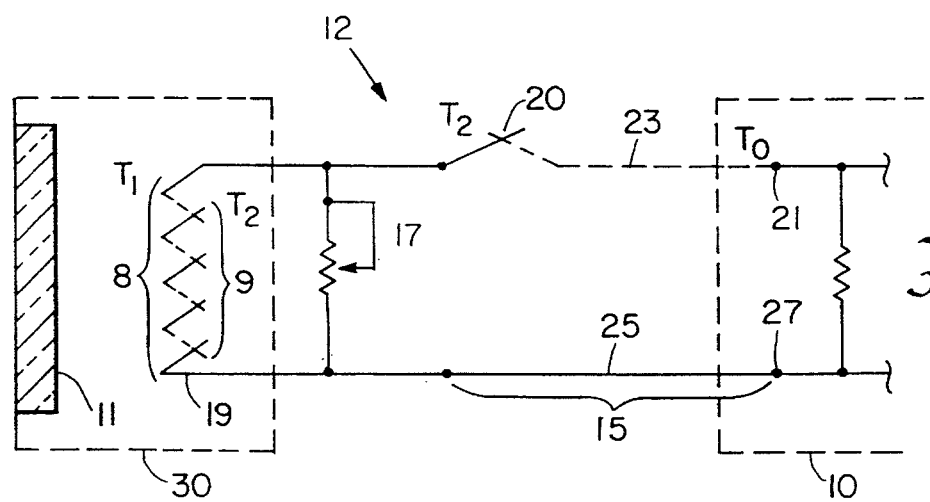
FIG. 1B shows a circuit similar to the circuit of FIG. 1A, but having a thermocouple in series with a thermopile.

FIG. 1B illustrates a further embodiment of a radiation detector 12 that uses the thermopile 19 and potentiometer 17 of the circuit of FIG. 1A, as well as a thermocouple 15. Thermal radiation emitted from a target enters detector 12 through window 11 of thermopile assembly 30 and is received in assembly 30 by thermopile 19. Thermopile 19 is connected in series to thermocouple 15 in a manner such that a final output voltage indicative of sensed radiation is provided across the ends of the lead wires 23 and 25 of thermocouple 15. These ends are connected to respective terminals 21 and 27 of readout device 10 which uses the final output voltage to provide an indication of target temperature as a function of sensed radiation.

The thermocouple 15 of the present embodiment increases the accuracy of the detector by providing compensation to the thermopile sensor for changes in thermopile cold junction temperature $T_2$. Rather than forcing $T_2$ to equal a particular temperature, or measuring $T_2$ to use in calculating the final meter output, the present invention uses thermocouple 15 to automatically compensate for fluctuation in $T_2$, while providing a reference temperature to the detector which is remote from the thermopile and the target.

A thermocouple is defined to produce a voltage between two junctions formed by two dissimilar metal wires connected to each other at their ends where one junction is at a different temperature than the second junction. Thermocouple 15 of FIG. 1B is made of wire 25 and wire 23. Wire 23 as shown by the broken line is of a different metal than wire 25. Effectively, the two junctions of thermocouple 15 are shown as junction 20 and terminals 21 and 27. Junction 20 is maintained at the same temperature ($T_2$) as the cold junctions 9 of thermopile 19. The second junction, terminals 21 and 27, is at temperature $T_0$. The voltage ($E_c$) produced across terminals 21 and 27 as a result of these two thermocouple junctions can be represented by the relationship $$E_c = \alpha_c(T_2-T_0) \qquad (2)$$

where $\alpha_c$ is a Seebeck coefficient for the thermocouple materials and $T_0$ is the temperature of terminals 21 and 27, typically at ambient temperature.

Since the thermopile 19 and the thermocouple 15 of FIG. 1B are connected electrically in series, the total output voltage $E_0$ appearing across terminals 21, 27 of the circuit of FIG. 1 is the combination of the thermopile output voltage $E_p$ and the thermocouple output voltage $E_c$, $$E_0 = E_p + E_c \qquad (7)$$

Combining equation (2) and equation (6):

$$E_0 = (1+c(T_2-T_R))\alpha_{pr}'e_t\sigma(T_T^4-T_2^4)K\alpha_c(T_2-T_0) \qquad (8)$$

As seen by readout device 10, the final output voltage across terminals 21 and 27 is the sum of the voltages produced by thermopile 19 and thermocouple 15 because they are connected in series. As shown in FIG. 1B, the hot junction of thermocouple 15 is at the same temperature ($T_2$) as the cold junction temperature of the thermopile 19. As $T_2$ increases, $T_1-T_2$ decreases and the thermopile output voltage $E_p$ decreases. But since $T_2$ is also the hot junction temperature of thermocouple 15, the increase in $T_2$ increases $T_2-T_0$, and the thermocouple output voltage $E_c$ also increases. Therefore, as long as the change in thermopile output voltage with temperature ($dE_p/dT$) is close to the change in thermocouple output voltage with temperature ($dE_c/dT$), the fluctuations in $T_2$ are negligible within a considerably wide range of fluctuation. In other words, as long as $$|dE_p/dT| \approx |dE_c/dT|$$

the decrease in $E_p$ due to $T_2$ increasing is approximately equal to the corresponding increase in $E_c$, and the total output voltage $E_0 = E_c + E_p$ is substantially unchanged. Proper selection of thermocouple material provides a value of $\alpha_c$ which makes the thermocouple voltage response which best compensates for changes in $T_2$.

The above analysis assumes that $T_0$ is kept constant, as is the case in the preferred embodiment. However, $T_0$ may also be monitored and used to compensate the output $E_0$ accordingly, if $T_0$ is allowed to fluctuate. Since $T_0$ is remote from the thermopile assembly, controlling and/or monitoring $T_0$ is a simple task. In fact, conventional thermocouple electronics include a stable temperature reference for the cold junction and the disclosed thermopile/thermocouple is compatible with such electronics.

According to the foregoing, the detector 12 provides an accurate temperature indication of target temperature from sensed radiation without the use of complex electronics or cumbersome calculations. The temperature detector of the present invention is confined to the temperature range of interest which allows an output signal to be provided which is a substantially linear function of sensed radiation, thus satisfying the requirements of a standard output meter. Since the temperature $T_0$ can be kept remote from the thermopile sensor, it can easily be held constant or measured separately. Since the thermal responses of the thermopile and thermocouple are close to one another in a temperature range of interest, changes in thermopile cold junction temperature are compensated for by the thermocouple and no measurement of the cold junction temperature of the thermopile is necessary. This removes the need for temperature sensors and/or heaters near the thermopile sensor.

The series connection of thermopile 19 and thermocouple 15 allows a target temperature $T_T$ to be measured relative to a reference temperature $T_0$ which may be remote from the thermopile. The location of terminals 21 and 27 may be selected to best suit the measuring purposes. The remote reference temperature removes the problems of isolating the cold junction reference temperature of a typical thermopile from ambient temperature and the heat of the target. Very often, radiation sensors may be too close to or actually touch the target surface, and gross inaccuracies result due to fluctuation of the cold junction temperature.

Since the slope of the fourth power curve 14 of FIG. 2 changes quickly with target temperature, it is important to select a temperature range of interest in which target temperatures are expected to fall. The thermopile output is then calibrated with potentiometer 17 such that its output is equal to a desired output voltage at a temperature in the center of the selected temperature range. This allows the thermopile output in the vicinity of the calibration temperature to appear approximately linear to an output device responsive to a linear voltage output in that temperature range. For example, the 200° F. calibration line 13 of FIG. 2 shows a linear function which intersects the curve 14 at the 200° F. point. This intersection point represents the calibration of the thermopile output for an expected target temperature of 200° F.

In a preferred embodiment of the invention, the 200° F. calibration is accurate for target temperatures between about 175° F. and about 225° F. A second calibration, shown by the intersection of curve 14 with line 29 of FIG. 2, is centered at 300° F. and is only accurate for target temperatures between about 275 F. and about 325 F. Other calibrations are also illustrated by the straight solid lines in FIG. 2.

Several examples of typical calibrations and resulting outputs of the present invention both with and without thermocouple 15 are shown in the following tables. Each table represents a different application for which the present invention might typically be used.

| TYMPANIC TEMPERATURE SENSOR | | | | | | | | |
|---|---|---|---|---|---|---|---|---|
| $T_T$ | $T_{TM}$ | $T_2$ | K | $T_R$ | $T_o$ | $\alpha_{pr}'$ | $\alpha_c$ | $\alpha_{cm}$ |
| With Thermocouple | | | | | | | | |
| 98.6 | 98.60 | 90 | .881 | 90 | 70 | 30 | 30 | 30 |
| 98.6 | 98.58 | 60 | .881 | 90 | 70 | 30 | 30 | 30 |
| 98.6 | 98.64 | 110 | .881 | 90 | 70 | 30 | 30 | 30 |
| Without Thermocouple | | | | | | | | |
| 98.6 | 98.6 | 70 | .86 | 70 | 70 | 30 | 0 | 30 |
| 98.6 | 108.62 | 60 | .86 | 70 | 70 | 30 | 0 | 30 |
| 98.6 | 58.7 | 110 | .86 | 70 | 70 | 30 | 0 | 30 |

| INDUSTRIAL TEMPERATURE SENSOR | | | | | | | | |
|---|---|---|---|---|---|---|---|---|
| $T_T$ | $T_{TM}$ | $T_2$ | K | $T_R$ | $T_o$ | $\alpha_{pr}'$ | $\alpha_c$ | $\alpha_{cm}$ |
| With Thermocouple | | | | | | | | |
| 500 | 500 | 90 | .245 | 90 | 70 | 30 | 30 | 23 |
| 500 | 509 | 40 | .245 | 90 | 70 | 30 | 30 | 23 |
| 500 | 490 | 150 | .245 | 90 | 70 | 30 | 30 | 23 |
| Without Thermocouple | | | | | | | | |
| 500 | 500 | 70 | .335 | 70 | 70 | 30 | 0 | 30 |
| 500 | 546 | 90 | .335 | 70 | 70 | 30 | 0 | 30 |
| 500 | 623 | 150 | .335 | 70 | 70 | 30 | 0 | 30 |

| HIGH TEMPERATURE APPLICATION | | | | | | | | |
|---|---|---|---|---|---|---|---|---|
| $T_T$ | $T_{TM}$ | $T_2$ | K | $T_R$ | $T_o$ | $\alpha_{pr}'$ | $\alpha_c$ | $\alpha_{cm}$ |
| With Thermocouple | | | | | | | | |
| 2000 | 2000 | 70 | .169 | 70 | 70 | 1 | 30 | 4.9 |
| 2000 | 1979 | 40 | .169 | 70 | 70 | 1 | 30 | 4.9 |
| 2000 | 2055 | 150 | .169 | 70 | 70 | 1 | 30 | 4.9 |
| Without Thermocouple | | | | | | | | |
| 2000 | 2000 | 70 | .169 | 70 | 70 | 1 | 0 | 4.9 |
| 2000 | 2163 | 40 | .169 | 70 | 70 | 1 | 0 | 4.9 |
| 2000 | 1565 | 150 | .169 | 70 | 70 | 1 | 0 | 4.9 |

As demonstrated by the above tables, the proper selection of $\alpha_{pr}'$ and the fine-tuning adjustment of K allows the displayed temperature output $T_{TM}$ of the detector to equal the actual target temperature $T_T$ for a given local temperature $T_2$. The meter used has a Seebeck coefficient calibration of $\alpha_{cm}$. The stability of $T_{TM}$ with fluctuations in $T_2$ is greatly enhanced by the use of a thermocouple. This improvement is demonstrated by the reduced fluctuation of $T_{TM}$ with $T_2$ in the above tables when the thermocouple is used as compared to when it is not used. Because the change in output signal of the thermopile with $T_2$ is inversely related to the change in the output signal of the thermocouple with $T_2$, the lower thermopile output signal due to rising $T_2$ is compensated for by an increased thermocouple output signal.

Besides achieving the desired calibration of the thermopile output, it is also desirable to improve the linearity of the fourth power relationship within the chosen temperature range of interest. As apparent from the curves of FIG. 2, the nonlinearity of the thermopile curve 14 increases with increasing target temperature. In order to increase the temperature range for which calibration is accurate, Applicant employs the following.

From the Stefan-Boltzmann relationship, the voltage output of thermopile 19, which is linearly related to sensed radiation, is nonlinearly related to target temperature. However, by filtering out short wavelengths of thermal radiation from the target (below about 7 microns), Applicant converts a region of the non-linear output from the thermopile 19 into one which is a better linear approximation. This result is achieved by using the fact that long wavelength radiation makes up a large percentage of the radiation emitted from the target at lower temperatures, but decreases relative to higher wavelengths as target temperature is increased above about 200° F. By using a window 11 with the circuit of FIG. 1B which is a material that filters out short wavelength radiation, the percentage of the total radiation emitted which actually reaches the thermopile decreases as target temperature increases. This relationship is illustrated by the curve 16 shown in FIG. 3.

Figure 3:
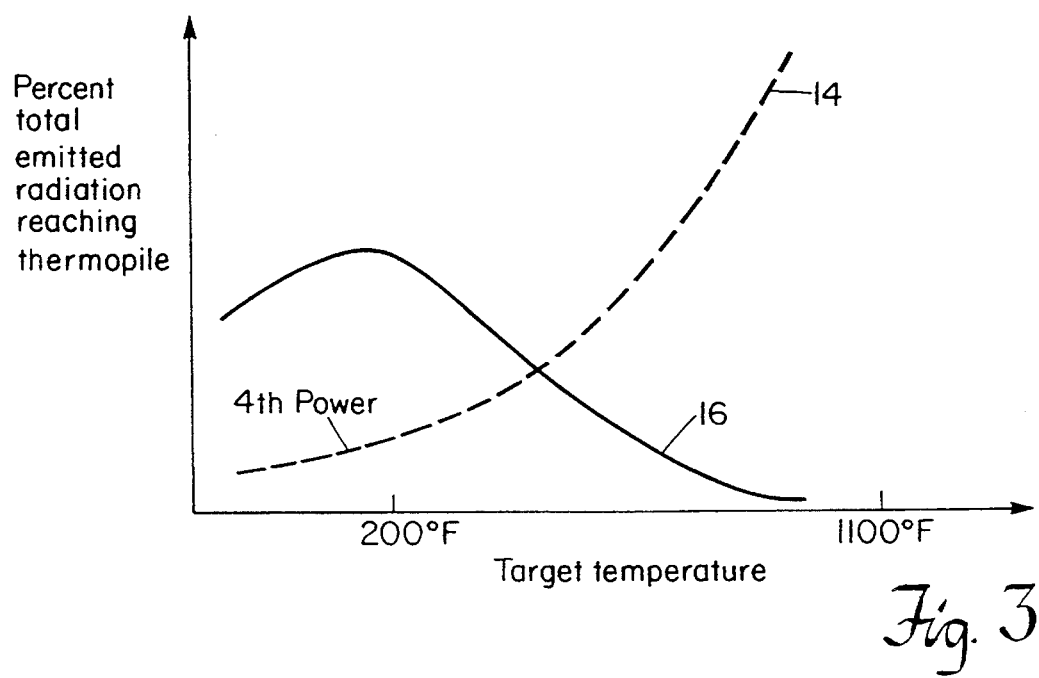
FIG. 3 is a graph of the relative percentage of total emitted radiation reaching the thermopile versus target temperature.

The curve 16 is a representation of the relative portion of the total emitted radiation reaching the thermopile. As target temperature increases, the percentage of long wavelength radiation making up the total emitted target radiation decreases. Correspondingly, the percentage of short wavelength radiation increases proportionally. However, the short wavelength radiation is blocked by the window filter 11 and does not reach the thermopile. Therefore, the 4th power curve, which is a function of sensed radiation, is flattened out at higher target temperatures to give the curve 65 shown in FIG. 2. The curve 65 thus represents the product of curve 14 and curve 16. The fourth power curve 14 is also shown in FIG. 3 so that the two curves 14, 16 can be compared. As shown by curve 65, the flattened fourth power thermopile curve more closely approximates a linear function to increase the accurate target temperature ranges.

To get the desired long wavelength pass (LWP) filtering of target radiation reaching thermopile 19, window 11 is preferably formed of a material such as silicon which passes radiation of long wavelengths (about 7 microns to 20 microns) and filters out radiation of short wavelengths (below about 7 microns). Other filter materials may also be used which have other wavelength cutoffs, and can otherwise change the shape of the fourth power curve.

The terminals 27 and 21 of thermocouple 15 are preferably adaptable to removable connections to various readout devices. Thus, the voltage across terminals 27, 21 is indicative of sensed radiation and may be supplied to various readout devices for displaying an indication of sensed temperature. Different lead wires for thermocouple 15 may be used for different readout devices. For example, lead wire 25 may be iron and lead wire 23 may be constantan for a J type readout meter. In this case, the final output voltage of the detector is preferably 30 μV/° F. of target temperature above about 70° F. Or, in another example, wires 23, 25 may be platinum and platinum RH, respectively, for readout meters of types R and S.

Common readout devices require input impedances higher than the impedance of potentiometer 17. If, however, input impedance to the readout device is of the same order as the potentiometer 17 impedance, then the range of target temperatures for which detector 12 is accurate may be further increased. Also, for detector configurations that are accurate below about 200° F., the detector is more stable if small internal resistance-capacitances and relatively large external resistance-capacitances are employed. Because the potentiometer 17, filter window 11 and receiving readout devices 10 are adjustable, the detector 12 is a versatile tool for detecting surface temperature or heat loss in various applications.

Figure 4:
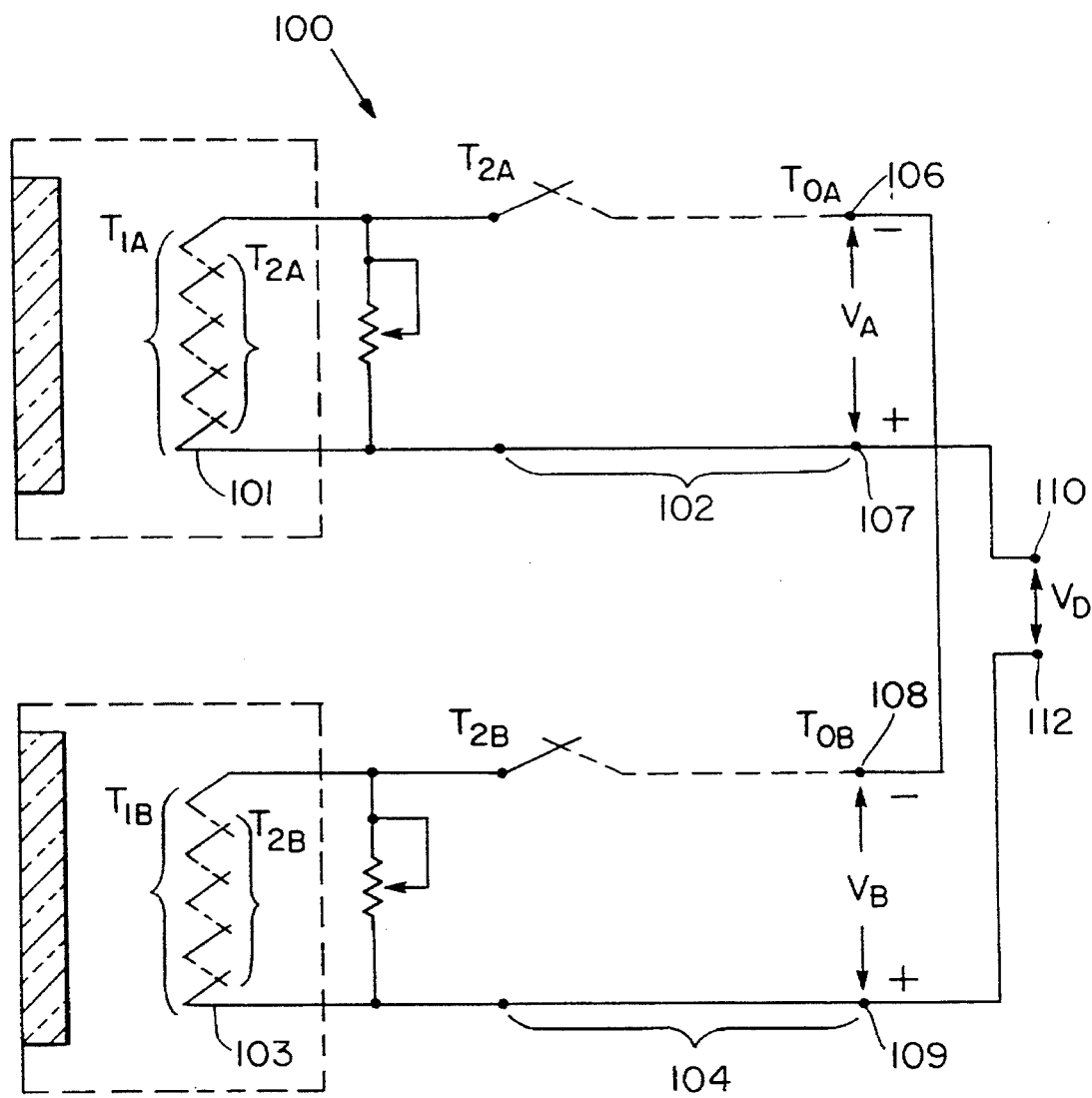
FIG. 4 is a diagram of an electrical circuit of a differential radiation detector of the present invention.

A different embodiment of the present invention is shown in FIG. 4. In the configuration of FIG. 4, each of two thermopiles 101, 103 is wired in series with its own thermocouple 102, 104. Therefore, in essence, two versions of the detector of FIG. 1B are provided but are wired differentially at their remote reference temperature outputs $T_{OA}$ and $T_{OB}$. In FIG. 4, the top sensor is referred to as sensor A and the bottom sensor is referred to as sensor B. Using the calculations discussed with relation to FIGS. 1A and 1B, the output voltage $V_A$ across terminals 106, 107 approximately equals $T_{1A}-T_{OA}$, and is therefore indicative of the temperature difference between the hot junction of thermopile assembly 101 and reference temperature $T_{OA}$. Similarly, the output voltage $V_B$ across output terminals 108, 109 of sensor B approximately equals $T_{1B}-T_{OB}$, and is indicative of the temperature difference between the hot junction of thermopile 103 and reference temperature $T_{OB}$. The thermopiles 101 and 103 as well as the thermocouples 102, 104 are well matched such that the output characteristics of sensor A and sensor B are as close as possible.

Since $T_{OA}$ and $T_{OB}$ may be remote from their respective thermopile sensors, they are easily held at the same reference temperature such that $T_{OA}=T_{OB}=T_0$. This is easily accomplished by locating the reference temperatures $T_{OA}$ and $T_{OB}$ in close proximity to one another or by thermally connecting them. Both sensor A and sensor B are therefore referenced to the same remote reference temperature $T_0$. Thus, their outputs may be compared in a differential manner. As shown in FIG. 4, terminal 106 of sensor A is wired to terminal 108 of sensor B to provide a common electrical reference. Terminal 107 of sensor A and terminal 109 of sensor B are then used as a differential output, and will be equal to $V_A-V_B$.

Since $$V_A = \alpha_A(T_{1A}-T_0)$$

and $$V_B = \alpha_B(T_{1B}-T_0)$$

$$V_D = V_A - V_B = \alpha_A T_{1A} - \alpha_A T_0 - \alpha_B T_{1B} + \alpha_B T_O$$

But since the two sensor circuits A and B are very closely matched, $\alpha_A \approx \alpha_B \approx \alpha$, and $$V_D = \alpha[T_{1A} - T_0 - T_{1B} + T_O]$$
$$= \alpha[T_{1A} - T_{1B}]$$

Therefore, $V_D$ is an accurate representation of the difference in temperature between the target of sensor A and the target of sensor B.

Because the arrangement of FIG. 4 allows each sensor to be referenced to remote temperature $T_0$ separately, it is not necessary that the cold junctions of thermopile 101 and 103 be thermally connected or proximate to one another. This provides a distinct advantage in allowing the differential sensor 100 to measure a difference in temperature between targets which are quite a distance from each other. The location, position and orientation of the sensors relative to one another does not affect the sensing as long as they have a common remote reference temperature $T_0$. No comparison of thermopile cold junction temperatures is necessary, and much of the complicated heating and measuring circuitry of past differential thermopile sensors may be omitted. It should be recognized that the remote reference temperature may be located anywhere including at one of the local reference temperatures $T_2$, but is generally most conveniently located at remote electronics removed from the sensed environment.

One notable use of the sensor design shown in FIG. 1B is as a tympanic temperature monitor to sense the temperature of a person's tympanic membrane, which is close in temperature to body core temperature. Often it is necessary or desirable to monitor a person's body temperature, such as during a surgical operation. Since no complex heaters or electronics are necessary in the region of the thermopile sensor, the package in which it is housed is very small and simple. The design of FIG. 1B thus allows a sensor to be inserted directly into a subject's ear canal with only lead wires leading out to an output device. Such a design would also be applicable to an ambulatory tympanic temperature monitor as well.

In the aforementioned embodiments, the thermopile and the thermocouple together form a detector suitable for applications involving an expected mean target temperature and a known thermopile cold junction temperature range. However, since the linear thermal response of the thermocouple is employed to compensate for the non-linear thermal response of the thermopile, the thermopile cold junction temperature range must be known and relatively narrow.

Figure 5A:
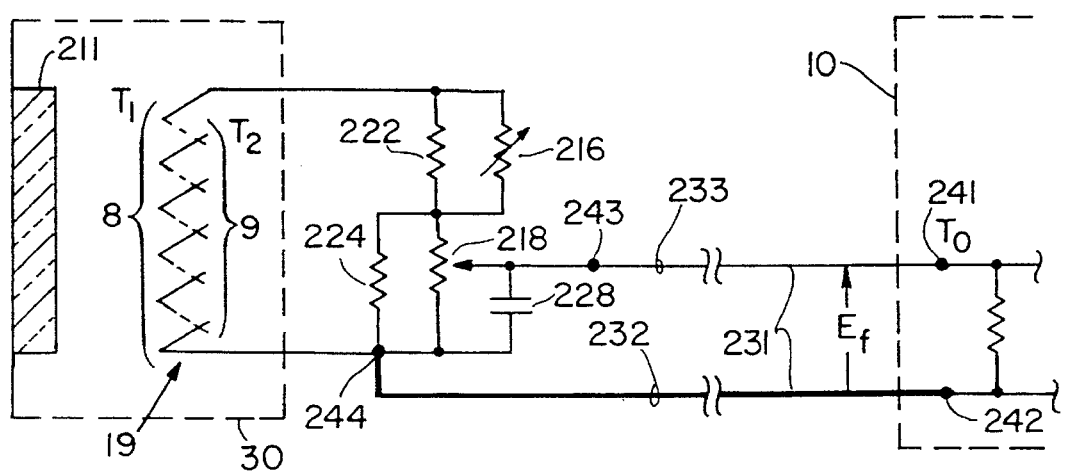
FIG. 5A is a diagram of an electrical circuit of a thermopile radiation detector embodying the present invention.

Referring to FIG. 5A, another embodiment of the present invention comprises a radiation detector having a temperature dependent variable resistor 216 coupled to the thermopile 19 and providing a variable resistance that combines with the thermopile output voltage to produce a linearized thermopile output voltage. As such, the thermopile output, linearized by the thermistor, combines the linear thermocouple output from thermocouple 231 to provide an detector output $E_o$ that is stable over a broad range of thermopile cold junction temperatures.

The radiation detector of FIG. 5A has a thermopile 19 which senses radiation emitted from a target entering through a window 211 and provides an output signal indicative of the target temperature. As in previous embodiments, a thermocouple 231 is connected electrically in series with the thermopile 19 and thermally coupled thereto. Since the thermocouple output changes linearly with changes in the thermopile cold junction temperature while the thermopile output signal changes non-linearly with said changes in the temperature of the thermopile cold junction, the thermocouple 231 provides temperature compensation for a somewhat narrow range of thermopile cold junction temperatures.

Figure 5B:
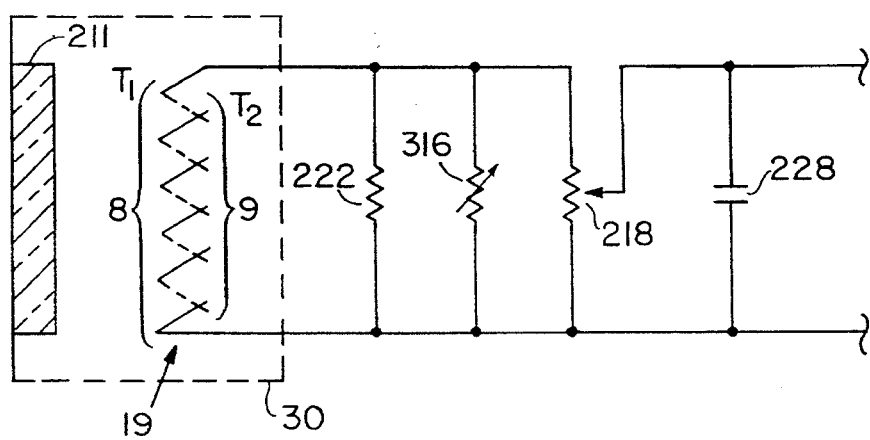
FIG. 5B is a diagram of an alternative electrical circuit of a thermopile radiation detector of FIG. 5A.

In accordance with another aspect of the present invention, a negative temperature coefficient (NTC) thermistor 216 is electrically connected in series with the thermopile 19 and thermally coupled to the cold junction 9 of the thermopile, providing a variable resistance that combines with the thermopile output voltage to produce a linearized output voltage with cold junction temperature. The linearized thermopile output voltage combines with the thermocouple output voltage to produce a stable total output voltage over a broad range of thermopile cold junction temperatures. Note that a positive temperature coefficient (PTC) thermistor 316 may be connected in parallel with the thermopile, as shown in FIG. 5B, to achieve the same result.

Figure 6A:
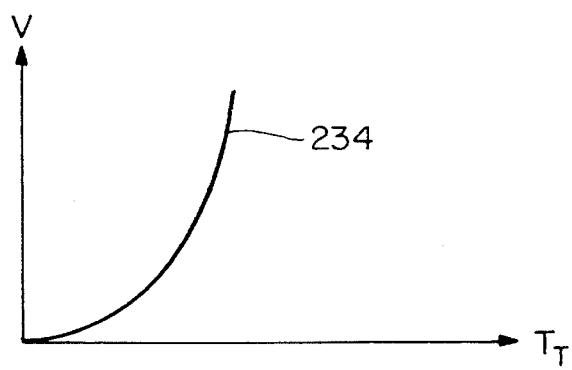
FIG. 6A is a graph of thermal response to sensed radiation of the thermopile of FIG. 1.
Figure 6B:
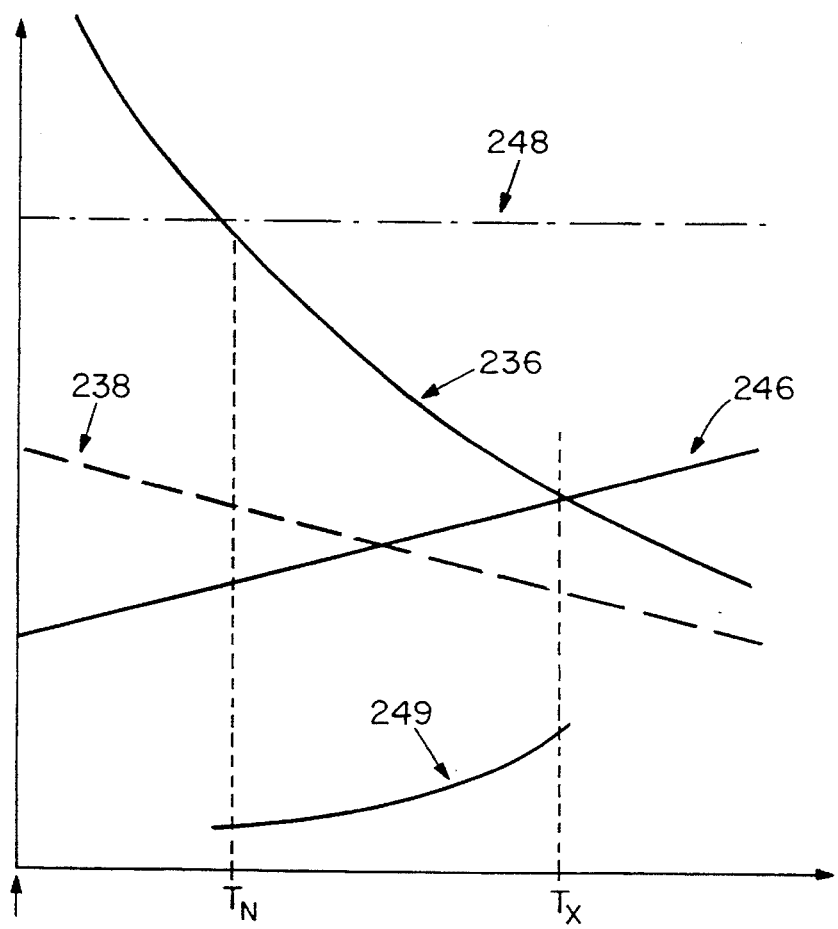
FIG. 6B is a graph of the thermal response to cold junction temperature for a fixed target temperature of the thermopile of FIG. 1.

Recall from equation (8) that the thermopile output voltage ($E_p$) changes nonlinearly with changes in $T_T$ and $T_2$ due to the presence of the fourth power term ($T_T^4 - T_2^4$). This fourth power term is demonstrated by the curve 234 of FIG. 6A which shows how the thermopile output voltage increases with increasing target temperature for a fixed thermopile cold junction temperature. The fourth power term is further demonstrated by the curve 236 of FIG. 6B which shows how the thermopile output voltage decreases with increasing thermopile cold junction temperature for a fixed target temperature. Also shown in FIG. 6B is curve 246 which demonstrates how the thermocouple output voltage ($E_c$) increases linearly with increasing thermopile cold junction (i.e., thermocouple hot junction) temperature.

Figure 6C:
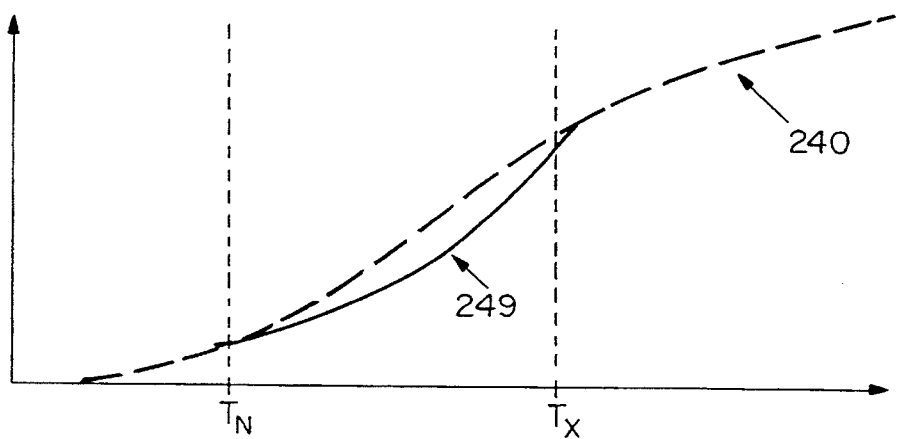
FIG. 6C is a graph of the thermal response for a fixed target temperature of a temperature dependent variable resistor of the radiation detector of FIG. 1.

Because of the inverse relationships of the thermopile and thermocouple outputs with change in cold junction temperature, the combined outputs can be made generally independent of cold junction temperature. To that end the thermopile output 236 is linearized to approximate a linear curve 238. The curve 238 combines with the thermocouple curve 246 to provide an output 248 which is generally constant with changes in cold junction temperature. To provide the linearized curve 238 over the cold junction temperature range of interest $T_N$ to $T_X$, the thermopile curve 236 should be multiplied by a curve 249. As illustrated in FIG. 6C where the Y axis is expanded, that curve 249 is approximated by a curve 240 in a temperature range of interest $T_N$ to $T_X$. The curve 240 is the result of a thermistor circuit as described below.

Referring back to FIG. 5A, the NTC thermistor 216 is connected to a pair of resistors R1 (at 222) and R2 (at 224) which combine with the thermistor to provide a variable resistance $R(T_2)$ having a response curve 240 shown in FIG. 6C. The curve 240 has a maximum resistance and a minimum resistance. Since the thermistor 216 and resistors 222, 224 are electrically connected in series with the thermopile 19 and thermally coupled to the thermopile cold junction 9, the resistance $R(T_2)$ combines with the thermopile output voltage ($E_p$) to produce an output voltage ($E_{p1}$) that changes approximately linearly with thermopile cold junction temperature.

Referring back to FIG. 5A, a thermocouple 231 is connected in series with the thermopile 19 and the thermistor 216 in a manner such that a final output voltage ($E_0$), indicative of sensed radiation of a target, is provided across the ends of the lead wires 231 and 233 of the thermocouple 231. These ends are connected to respective terminals 241 and 242 of readout device 10 which uses $E_0$ to provide an indication of target temperature. For a given target temperature, the thermocouple 231 provides compensation to the linearized thermopile output signal for changes in thermopile cold junction temperature $T_2$ such that the final output voltage ($E_0$) remains constant. Rather than forcing $T_2$ to equal a particular temperature, or measuring $T_2$ to use in calculating the final output voltage, the thermocouple 231 automatically compensates for changes in the linearized output ($E_{p1}$) with fluctuations in $T_2$.

Thermocouple 231 of FIG. 5A is made of wire 232 and wire 233. Wire 232 as shown by the broken line is of a different metal than wire 233. Effectively, the two junctions of thermocouple 231 are shown as terminals 241 and 242 and terminals 243 and 244. The first junction, at terminals 243 and 244, is at the thermopile cold junction temperature. The second junction, at terminals 241 and 242, is at temperature $T_0$. Recall from equation (2) that the voltage ($E_c$) produced across terminals 241 and 242 as a result of these two thermocouple junctions can be represented by the relationship $$E_c = \alpha_c (T_2 - T_0) \qquad (9)$$

where $\alpha_c$ is a Seebeck coefficient for the thermocouple materials and $T_0$ is the temperature of terminals 241 and 242, typically at ambient temperature.

Since the thermopile 19, the thermistor 216 and the thermocouple 131 of FIG. 5A are connected electrically in series, the total output voltage $E_0$ appearing across terminals 241 and 242 is the combination of the linearized thermopile output voltage $E_{p1}$ and the thermocouple output voltage $E_c$, $$E_0 = E_{p1} + E_c \qquad (10)$$

Further, since the thermocouple hot junction is at the same temperature as the thermopile cold junction, the thermocouple output voltage response is inversely related to the linearized thermopile output voltage response for changes in $T_2$. Thus, referring to FIG. 6B, the thermocouple voltage response 246 is inversely related to the linearized thermopile output voltage response 238 for changes in the thermopile cold junction temperature range. As T2 increases, the thermopile output voltage $E_p$ decreases. But since $T_2$ is also the hot junction temperature of thermocouple 231, the increase in $T_2$ causes the thermocouple output voltage $E_c$ to increase such that fluctuations in $T_2$ have a negligible effect on the total output signal 248. Thus, as long as the decrease in $E_{p1}$ due to $T_2$ increasing is equal to the corresponding increase in $E_c$, the total output voltage response 248 ($E_0=E_c+E_p$) is substantially unchanged.

The above analysis assumes that $T_0$ is kept constant, as is the case in the preferred embodiment. However, $T_0$ may also be monitored and used to compensate the output $E_0$ accordingly, if $T_0$ is allowed to fluctuate. Since $T_0$ is remote from the thermopile assembly, controlling and/or monitoring $T_0$ is a simple task. In fact, conventional thermocouple electronics include a stable temperature reference for the cold junction and the present invention is compatible with such electronics. By using the thermocouple in series with the thermopile, the remote controlled thermocouple reference $T_0$ becomes the thermopile reference temperature. As such, there is no need to monitor the internal cold junction temperature of the thermopile.

Referring once again to FIG. 5A and FIG. 6B, a potentiometer may be employed to fine-tune the linearized thermopile output response 238 to intersect a thermocouple output response 246 at a desired target temperature to produce a stable total output $E_0$ over a broad thermopile cold junction temperature range. More specifically, a potentiometer 218 scales the linearized thermopile output $E_{p1}$, allowing the detector to be fine-tuned to an expected target temperature. This ensures that the total output signal $E_0$ is as accurate as possible within a range around the target temperature.

Having the manually adjustable potentiometer 182 also allows a user of the detector to correct for any variations of the detector due to manufacturing tolerances or other influences. For example, thermopiles have parameters, such as characteristic impedance $R_s$, that vary significantly from device to device. The potentiometer may be adjusted to compensate for these variations such that a number of detectors provide the same total output response for a given range of thermopile cold junction temperatures. The presence of potentiometer scaling factor K in equation (8) shows that the linearized output voltage $E_{p1}$ can be controlled by controlling the setting of the potentiometer.

Referring to FIG. 5A, both the thermopile and the output device 10 are high impedance devices, so the radiation detector acts as an antenna receiving stray high frequency noise which distorts the measurement by the output device 10. Accordingly, the radiation detector also comprises a capacitor 228 connected in parallel to its output leads to attenuate high frequency noise, especially noise at and above 60 Hz. Preferably, the capacitor has a value of 1–5 μf. At low frequencies, the capacitor 228 has no effect on the output impedance of the radiation detector as it resembles an open circuit. However, at high frequencies, the capacitor approaches a short circuit, such that radiation detector output impedance becomes low, thereby attenuating high frequency noise at the output device 10.

Figure 7:
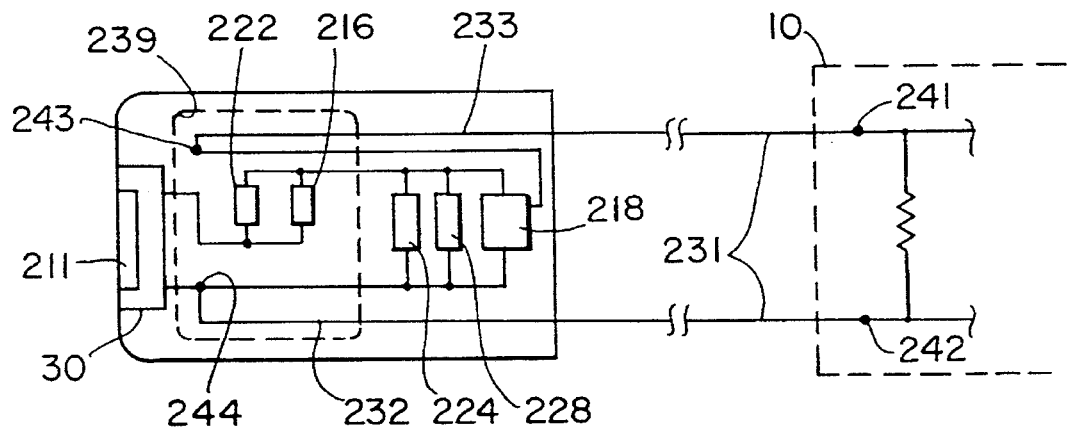
FIG. 7 is a plan view of the radiation detector of FIG. 5A.

Referring to FIG. 7, in accordance with another aspect of the present invention, the thermocouple 231 may comprise a non-intersecting pair of leads formed of different materials and coupled to a thermopile circuit such that the thermopile circuit actually serves as the hot junction of the thermocouple. As explained previously, the thermocouple 231 is formed of two wires 232 and 233 formed of dissimilar metals. Since the thermocouple is electrically connected in series with the thermopile, both thermocouple wires are electrically connected at different locations to the thermopile circuit. More specifically, the first thermocouple lead 232 is electrically connected at junction 244 to one of the thermopile leads which is connected to a thermopile circuit and therefore held at the cold junction temperature of the thermopile. Although the second thermocouple lead 233 is not electrically connected directly to a thermopile lead, it is electrically connected at junction 243 to the thermopile circuit. Further, the second thermocouple lead is mounted in close proximity to the thermopile and thermally coupled to the cold junction of the thermopile with epoxy 239. With both thermocouple leads held at the same temperature, the temperature of the thermopile cold junction, the leads do not have to intersect to provide a thermocouple hot junction.

Figure 8:
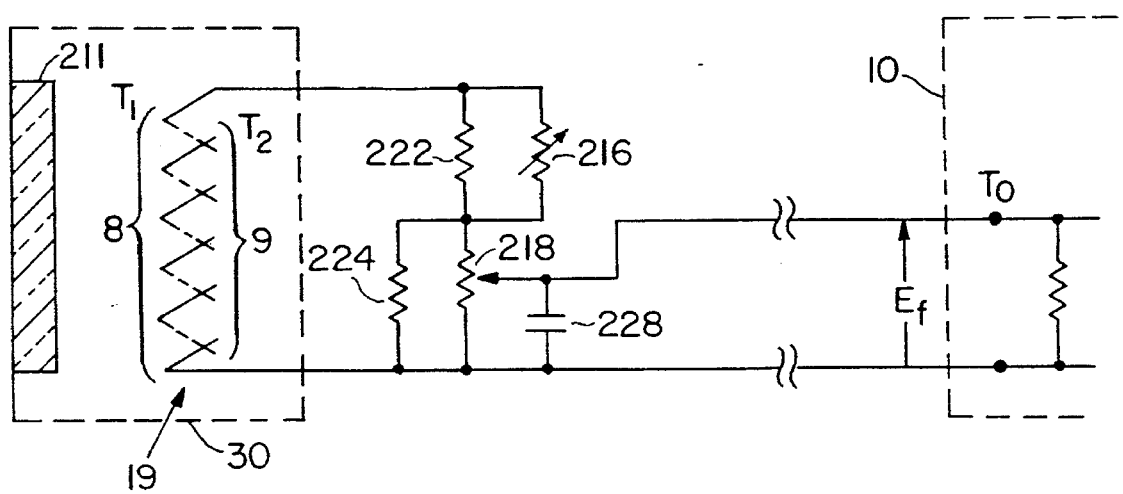
FIG. 8 is a diagram of an electrical circuit of a alternative embodiment thermopile radiation detector of the present invention.

Referring to FIG. 8, yet another embodiment of the present invention comprises a radiation detector having a thermopile 19 and a thermistor 216 and providing a linearized thermopile output voltage over thermopile cold junction temperature. This embodiment does not include a thermocouple. Since the linearized thermopile output is a linear function with changes in the thermopile cold junction temperature, the output detected by a meter 10 only requires a linear compensation for cold junction temperature. In prior embodiments, the thermocouple is the linear compensation element. However, more conventional thermopile systems sense the cold junction temperature, as with a temperature detecting thermistor, and then provide compensation to the signal detected by the meter. A linear compensation is generally easier to make.

Figure 9:
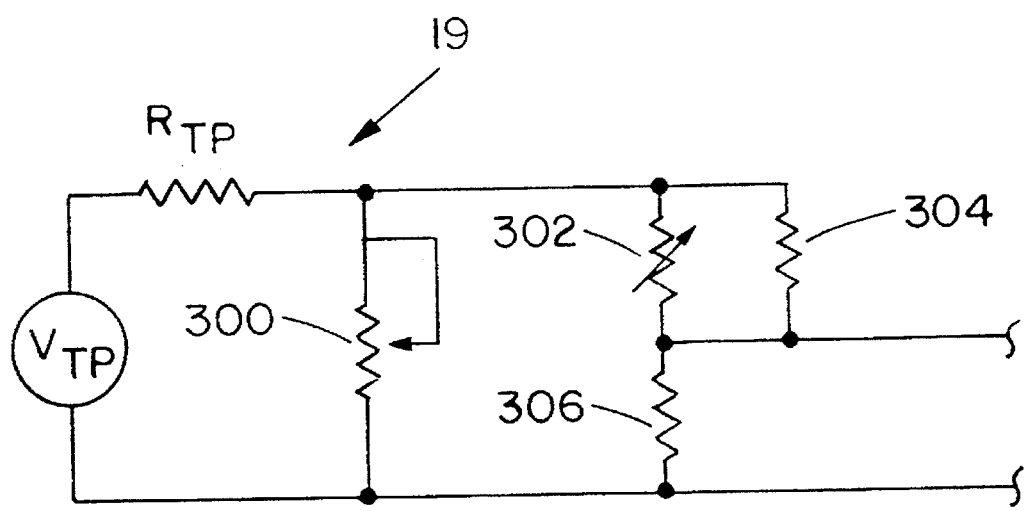
FIG. 9 is an electrical circuit diagram of yet another embodiment of the invention.

FIG. 9 illustrates yet another embodiment of the radiation detector circuit. In this circuit, the thermopile 19 is shown as its electrical equivalents of a voltage source $V_{TP}$ and in internal resistance $R_{TP}$. A user adjustable potentiometer 300 is coupled directly across the thermopile 19 to allow for calibration of the thermopile output. As before, a temperature dependent resistor 302, in cooperation with parallel resistor 304 and series resistor 306, make the output taken across resistor 306 generally independent of cold junction temperature. With the potentiometer 300 coupled directly across the thermopile rather than at the output leads, the output impedance of the circuit can be minimized while also minimizing the sizes of the resistors and thus of power losses in the circuit.

From equation 3, it can be seen that the output voltage of the thermopile is directly dependent on the emissivity of the target surface. Accordingly, very low emissivity materials such as shiny metal present particular difficulties in using radiation detectors. Reflections from the environment should be minimized as by using a conical cup about the sensor aperture as suggested in U.S. Pat. No. 4,636,091. Because of the low signal received from the low emissivity target, a relatively large thermopile having a large Seebeck coefficient is required to provide a suitable output. A further difficulty is presented by the fact that the emissivity is itself a function of temperature, and changes in emissivity with temperature become significant with the lower levels of detected emissions. Thus, it becomes even more important that the thermopile include a calibrator to enable the output signal to be adjusted to provide a desired output response at a desired target temperature from a target surface of a particular emissivity.

The effect of emissivity changing as a function of temperature can be reduced by using a filter 11 which limits the sensed radiation to shorter wavelengths. At less than 5 microns, the change in thermopile output with temperature is significantly greater than the change in thermopile output with emissivity. Unfortunately, just as the selection of long wavelengths serves to flatten the detector response, the selection of shorter wavelengths increases the nonlinearity of the detector response. Accordingly, it becomes even more critical that the device be user calibrated to a particular target temperature, since the added nonlinearity significantly reduces the range of accurate measurement.

While the invention has been particularly shown and described with reference to the preferred embodiments thereof, it will be understood by those skilled in the art that various changes in form and details may be made without departing from the spirit and scope of the invention as defined by the appended claims.

What is claimed is:

1. A radiation detector comprising:
   a thermopile sensing radiation from a target and providing an output signal indicative of the temperature of the target;
   a variable resistance coupled across an output of the thermopile in a passive circuit, the variable resistance being adjustable by a user to allow scaling of the thermopile output signal.

2. A radiation detector as claimed in claim 1 further comprising an output meter receiving the output signal from the thermopile and providing a display of target temperature in response thereto.

3. A radiation detector as claimed in claim 1 further comprising a thermocouple generating an output signal which combines with the output signal of the thermopile to produce a total output signal.

4. A radiation detector as claimed in claim 1 wherein the variable resistance is manually adjustable by a user to calibrate the output signal to intersect a thermocouple output response at a desired target temperature.

5. A radiation detector as claimed in claim 1 further comprising a filter which filters out longer wavelength radiation for improved response to low emissivity targets.

6. A method of detecting radiation from a target, the method comprising:
   providing a thermopile sensing radiation from a target and providing an output signal indicative of the temperature of the target; and
   for a particular application, scaling the thermopile output signal with a variable resistance coupled across an output of the thermopile in a passive circuit to calibrate the output signal to intersect a thermocouple output response at a desired target temperature.

7. A method as claimed in claim 6 further comprising displaying an indication of target temperature on an output meter receiving the output signal from the thermopile.

8. A method as claimed in claim 6 further comprising providing a thermocouple generating an output signal which combines with the output signal of the thermopile to produce a total output signal.

9. A method as claimed in claim 6 wherein the variable resistance is user accessible and the thermopile output signal is scaled by a user.

10. A radiation detector comprising:
    a thermopile sensing radiation from a target and providing an output signal indicative of the temperature of the target;
    a resistance coupled across an output of the thermopile in a passive circuit to provide approximate linear scaling of the thermopile output signal within a given temperature range.

11. A radiation detector as claimed in claim 10 further comprising an output meter receiving the output signal from the thermopile and providing a display of target temperature in response thereto.

12. A radiation detector as claimed in claim 10 further comprising a thermocouple generating an output signal which combines with the output signal of the thermopile to produce a total output signal.

13. A radiation detector as claimed in claim 10 wherein the resistance is a variable resistance which is manually adjustable by a user.

14. A radiation detector as claimed in claim 10 having the scaled thermopile output signal coupled to a thermocouple meter.

15. A method of detecting radiation from a target, the method comprising:
    providing a thermopile sensing radiation from a target and providing an output signal indicative of the temperature of the target; and
    approximately linearly scaling the thermopile output signal within a given temperature range with a resistance coupled across an output of the thermopile in a passive circuit.

16. A method as claimed in claim 15 further comprising displaying an indication of target temperature on an output meter receiving the output signal from the thermopile.

17. A method as claimed in claim 15 further comprising providing a thermocouple generating an output signal which combines with the output signal of the thermopile to produce a total output signal.

18. A method as claimed in claim 15 wherein the resistance is a variable resistance and further comprising tuning the output signal with the variable resistance for a desired target temperature.

19. A method as claimed in claim 15 wherein the thermopile output signal is scale to match a specific thermocouple output response at a desired target temperature.

* * * * *